(12) United States Patent
Utley et al.

(10) Patent No.: US 9,166,215 B2
(45) Date of Patent: Oct. 20, 2015

(54) BATTERY PACK

(75) Inventors: Brian Utley, Canton, MI (US);
Saravanan Paramasivam, South Lyon, MI (US); Debbi Callicoat, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 799 days.

(21) Appl. No.: 13/312,323

(22) Filed: Dec. 6, 2011

(65) Prior Publication Data
US 2013/0143083 A1  Jun. 6, 2013

(51) Int. Cl.
| | |
|---|---|
| *H01M 2/12* | (2006.01) |
| *H01M 2/10* | (2006.01) |
| *H01M 2/20* | (2006.01) |
| *H01M 10/625* | (2014.01) |
| *H01M 10/6563* | (2014.01) |
| *H01M 10/6566* | (2014.01) |
| *H01M 10/613* | (2014.01) |

(52) U.S. Cl.
CPC .......... *H01M 2/1252* (2013.01); *H01M 2/1077* (2013.01); *H01M 2/12* (2013.01); *H01M 2/206* (2013.01); *H01M 10/613* (2015.04); *H01M 10/625* (2015.04); *H01M 10/6563* (2015.04); *H01M 10/6566* (2015.04)

(58) Field of Classification Search
CPC ... H01M 2/1252; H01M 2/1077; H01M 2/12; H01M 2/206; H01M 10/625; H01M 10/6563; H01M 10/6566; H01M 10/613
See application file for complete search history.

(56) References Cited

U.S. PATENT DOCUMENTS

| | | | |
|---|---|---|---|
| 4,444,853 A * | 4/1984 | Halsall et al. | 429/54 |
| 4,613,550 A * | 9/1986 | Jergl et al. | 429/53 |
| 2009/0011326 A1* | 1/2009 | Wood et al. | 429/99 |
| 2009/0017366 A1* | 1/2009 | Wood et al. | 429/62 |
| 2011/0274951 A1* | 11/2011 | Yasui et al. | 429/53 |

FOREIGN PATENT DOCUMENTS

| | | | | |
|---|---|---|---|---|
| JP | 2009170258 | | 7/2009 | |
| WO | WO2008/074034 | * | 6/2008 | ............ H01M 10/50 |
| WO | 2010019503 A2 | | 2/2010 | |
| WO | 2010019764 A2 | | 2/2010 | |
| WO | 2010030605 A2 | | 3/2010 | |

* cited by examiner

*Primary Examiner* — Helen O Conley
(74) *Attorney, Agent, or Firm* — David B. Kelley; Brooks Kushman P.C.

(57) ABSTRACT

A battery pack of the type that may be used in an electrically-powered vehicle comprises first and second arrays of cells disposed adjacent one another, and a housing enclosing the two arrays. The housing defines a cooling chamber surrounding heat transfer surfaces of the cells, a first manifold sealed from the cooling chamber and collecting gasses generated by the first array, and a second manifold sealed from the cooling chamber and collecting gasses generated by the second array. A tunnel connects the first and the second manifolds to allow passage of any collected gasses from the first manifold into the second manifold, and a discharge opening in the second manifold allows the collected gasses to escape from the housing. An electrically conductive bridge bar extends through the tunnel and connects the first array with the second array.

6 Claims, 3 Drawing Sheets

BATTERY PACK

TECHNICAL FIELD

The invention relates to battery packs of the type used in motor vehicles powered by a high-voltage electric motor.

BACKGROUND

Depending on its type—e.g., the chemical reactions involved—a power supply such as a battery cell or a battery pack may emit a certain amount of gas during its working life. Providing a ventilation system to allow such byproduct gasses to escape the power supply may be desirable in certain applications, such as when a battery pack is used in a vehicle. To vent battery cells and battery packs carried aboard a wheeled motor vehicle (such as a car, truck, van, SUV, construction vehicle, etc.), an elaborate system may be required to capture the byproduct gases and exhaust them out of the vehicle. Adding to this design challenge is that, in a system of multiple cells in a stack or array, the tolerance stack-up of the cells with its neighboring cells may make it difficult to provide robust sealing for a byproduct gas venting system.

Many battery packs require a cooling system to maintain proper system operation over the expected range of operating conditions and temperatures. In motor vehicles, cooling is commonly achieved by providing a flow of air through the pack so that it passes over/around the individual cells. The air may be drawn from the interior and/or the exterior of the vehicle, and may likewise be exhausted to the interior and/or exterior of the vehicle. If the battery pack cooling gas is exhausted into the vehicle interior, it is generally desirable for any byproduct gasses that may be emitted by the battery cells to be kept separate from the cooling gas stream so that the byproduct gasses do not enter the passenger compartment.

SUMMARY

According to a disclosed embodiment, a battery pack comprises first and second arrays of battery cells and a housing surrounding the two arrays. The housing defines a first manifold adjacent to the first array to collect gasses generated by the first array, and a second manifold adjacent to the second array to collect gasses generated by the second array. A tunnel is formed in the housing that connects the two manifolds to allow passage of gasses from the first into the second manifold. A discharge opening in the housing allows gasses to escape from the second manifold.

According to a disclosed embodiment, a bridge bar connects the first array with the second array, at least a portion of the bridge bar disposed in the tunnel connecting the two arrays.

According to a disclosed embodiment, the bridge bar may be provided with seals, for example by over-molding a polymer, rubber, or rubber-like material over an electrically conductive portion of the bridge bar.

According to another disclosed embodiment, a housing for a battery pack having first and second cell arrays comprises a first portion sealingly covering a surface of the first array and defining a first manifold collecting gasses issuing from vent openings on the surface of the first array, and a second portion sealingly covering a surface of the second array and defining a second manifold collecting gasses issuing from vent openings on the surface of the second array. The second portion has a discharge opening therein to allow gasses to escape from the housing, and a tunnel connects the first and the second manifolds to allow gasses collected in the first manifold to pass into the second manifold before escaping through the discharge opening.

According to another disclosed embodiment, a battery pack comprises first and second arrays of cells disposed adjacent one another, and a housing substantially enclosing the first and second arrays. The housing defines a cooling chamber surrounding heat transfer surfaces of the cells, a first manifold sealed from the cooling chamber and collecting gasses generated by the first array, and a second manifold sealed from the cooling chamber and collecting gasses generated by the second array. A tunnel connects the first and the second manifolds to allow passage of any collected gasses from the first manifold into the second manifold, and a discharge opening in the second manifold allows the collected gasses to escape from the housing. A bridge bar extends through the tunnel and electrically connects the first array with the second array.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
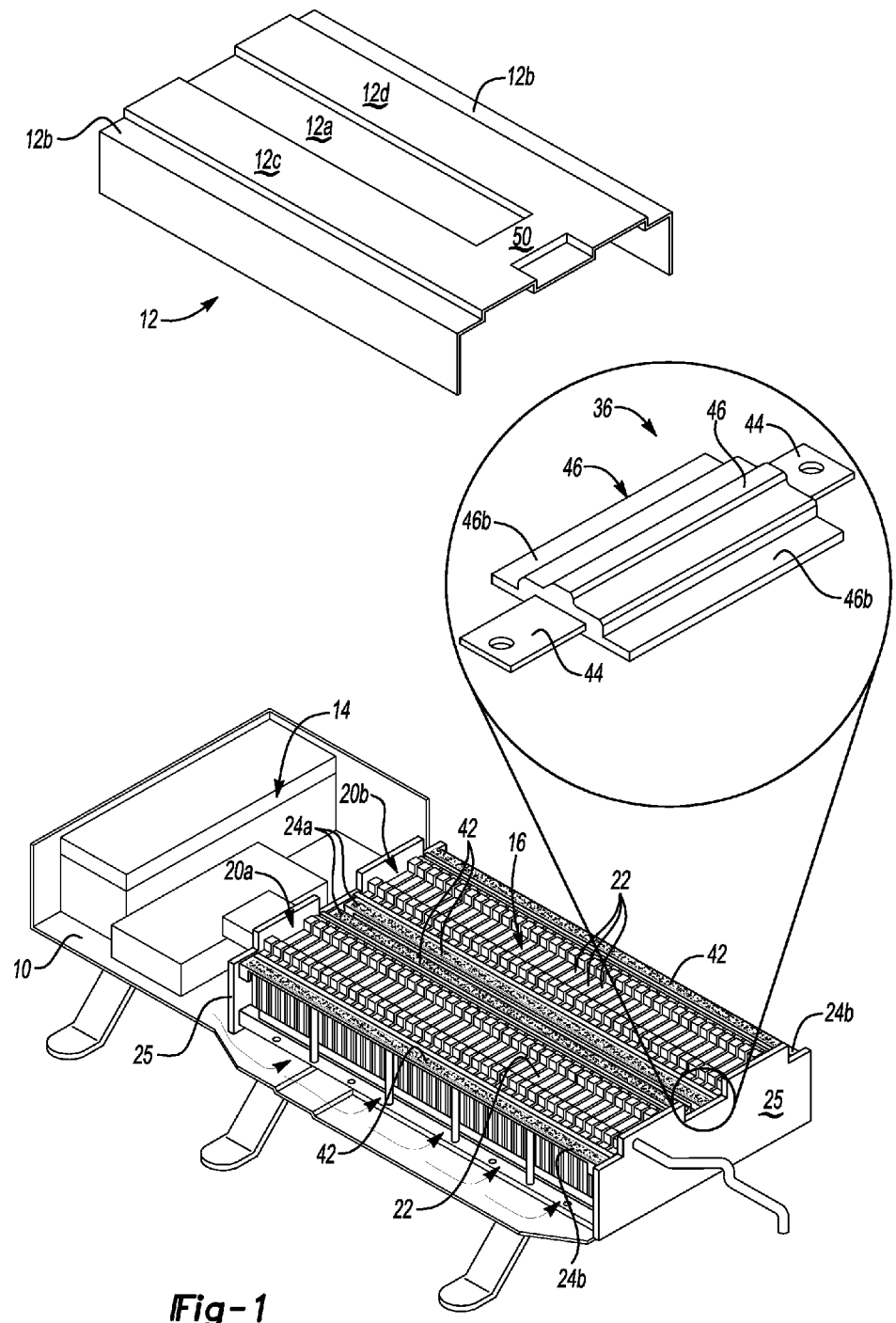
FIG. 1 is a perspective, partially exploded view of a battery pack in accordance with a disclosed embodiments.

As shown in FIG. 1, a battery pack in accordance with an embodiment of the invention includes a housing made up of a base 10 and a cover 12 that is shown removed to expose the interior of the battery pack. The battery pack interior may be divided into an electronics section 14 and a battery cell section 16. The battery pack is adapted for use in an automotive vehicle.

Figure 3:
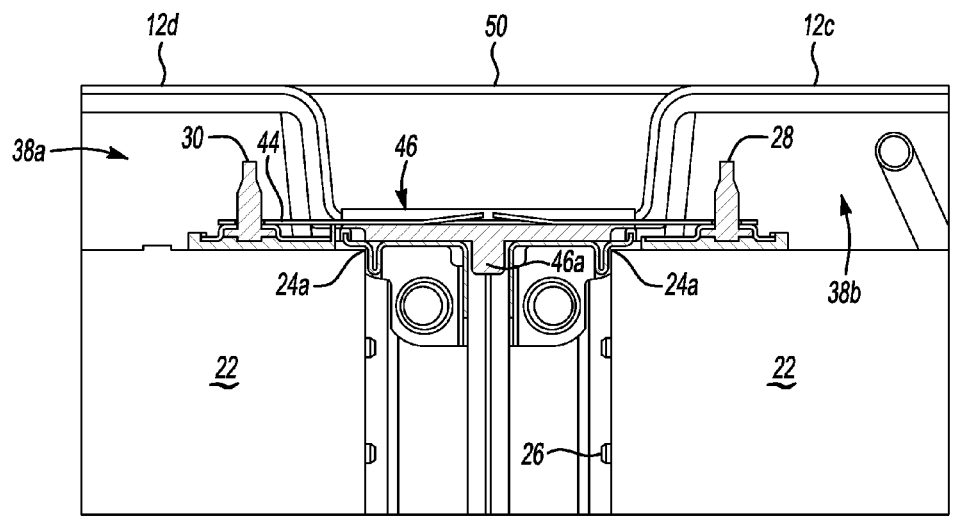
FIG. 3 is a cross-sectional view showing additional features of the bridging bar and installation of FIG. 2.

Battery cell section 16 includes two generally parallel arrays 20a, 20b each of which comprises a plurality of voltaic cells 22. The voltaic cells 22 of each array 20a, 20b are supported in a linear arrangement by a chassis which may, for example, comprise inner and outer support rails 24a, 24b connected at either end to end plates 25. Spacers 26 (best seen in FIG. 3) may be located between adjacent voltaic cells 22 to allow a flow of cooling gas, usually ambient air, to pass. Spacers 26 may be integrated with the voltaic cells 22 or may be separate components assembled to the cells when the arrays are built up. Spacers 26 may also be utilized as and/or combined with mounting brackets to retain cells 22 in position relative to support rails 24a, 24b and to adjacent cells.

Seals are provided between the upper edges of adjacent pair of cells 22 within each array. In the depicted embodiment, portions of spacers 26 adjacent the upper edges of cells 22 act as seal.

When cover 12 is fastened to base 10 to enclose battery cell section 16, a center portion 12a of the cover seals against the top surfaces of inner support rails 24a. In a similar fashion, outboard portions 12b of the cover seal against the top surfaces of outer support rails 24b. These four linear seals combine with the seals between the upper edges of adjacent cells 22 to form a sealed cooling chamber below the upper surfaces of the two arrays 20a, 20b. Clearance is provided between the side walls of cover 12 and the outboard edges of cells 22 (beneath outer rails 24b) so that cooling gas is able to flow generally horizontally between cells.

The surfaces of cells 22 that face one another within each array (the vertical surfaces as viewed in the present figures) are adapted to enable heat transfer between the cells and the cooling gas, as is well known in the art. In FIG. 1, flow arrows F indicate a possible direction of the cooling flow. One or more fans or other gas movement devices (not shown) may be provided to force cooling gas through the battery pack, and/or ram air from movement of the vehicle may be used to induce the cooling flow. If air is used as the cooling gas, the air may come from exterior to the vehicle and/or from within the interior of the vehicle. Some or all of the cooling gas exiting the battery pack may be returned to the vehicle interior for climate control purposes, and/or some may be exhausted exterior of the vehicle.

Cover 12 further comprises two raised portions 12c, 12d located directly above the respective arrays 20a, 20b when the cover is attached to base 10. Raised portions 12c, 12d sealingly cover the upper surfaces of arrays 20a, 20b to define a pair of vent chambers or manifolds 38a, 38b (see FIG. 2) extending along and above the length of the respective arrays. Since vent holes 32 are located in/on the portions of cells 22 that form the upper surfaces of arrays 20a, 20b, any byproduct gasses issuing from the vent holes will be contained by vent manifolds 38a, 38b.

Figure 2:
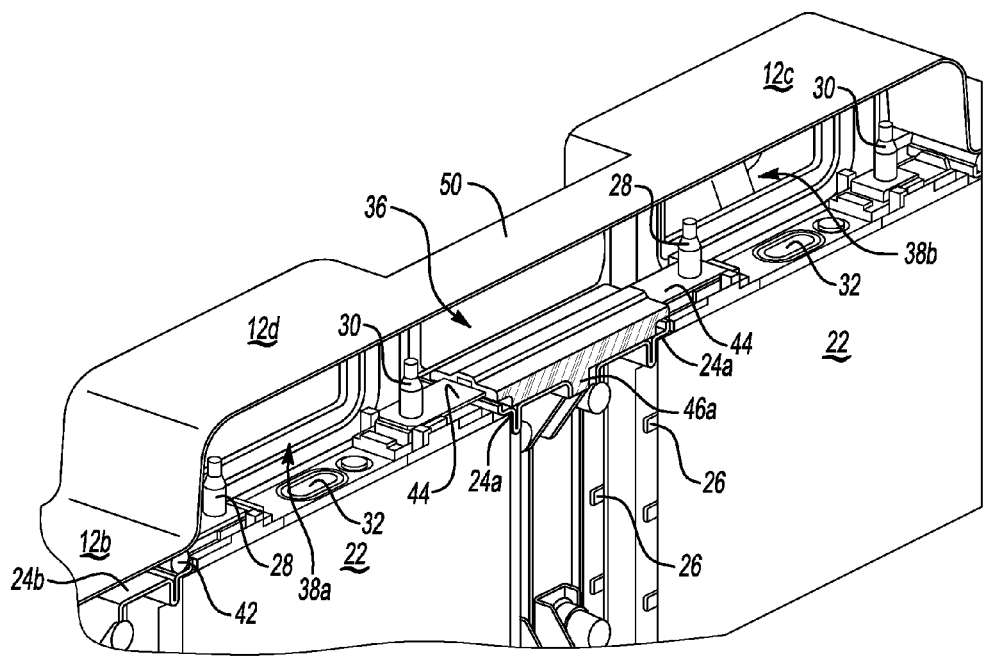
FIG. 2 is a perspective section view of the battery pack of FIG. 1, showing the installation of a bridging bar joining the two arrays of the battery pack.

As best seen in FIG. 2, each voltaic cell 22 has a positive terminal 28, a negative terminal 30, and a vent hole 32. Busbars, wires, or other electrically conductive connectors (not shown) interconnect the appropriate terminals of adjacent battery cells 22 so that the cells within each array 20a, 20b are connected in electrical series, as is well known in the art.

In addition to connecting the cells within each array 20a, 20b in series, it may be necessary for the two arrays to be connected in series to achieve a desired voltage level for the battery pack. In this case, a terminal of a cell in array 20a is connected with a terminal of a cell in the other array 20b having the appropriate (opposite) polarity. This connection may be made by a bridge bar 36 extending between the inboard terminal (closest to the center-line of battery pack dividing the two arrays) at the extreme end of first array 20a, and the adjacent inboard terminal of array 20b.

During some abnormal operating conditions, such as overheating, the voltaic cells 22 may generate a gaseous byproduct. To prevent an undesirable pressure buildup within the cells, any such byproduct gases are allowed to escape from the cells through vent holes 32. It is generally desirable that any byproduct gases be exhausted outside of the vehicle rather than being allowed to enter the interior of the vehicle. If the cooling gas circulating through the battery arrays is returned to the vehicle interior, as is commonly the case, this dictates that the byproduct gases must be kept separate from the cooling gas flow. This may be achieved by providing gas-proof seals at appropriate locations in the vicinity of the tops of the cells 22 so that the cooling gas is kept below the upper surface of battery arrays 20a, 20b and a separate manifold is defined above the arrays for collecting any byproduct gases issuing from vent holes 32.

Center section 12a of the cover seals against the top surfaces of inner support rails 24a when the cover is attached to base 10. In a similar fashion, outboard portions 12b of the cover seal against the top surfaces of outer support rails 24b. Raised portions 12c, 12d are located directly above the respective arrays 20a, 20b and define first and second vent manifolds 38a, 38b (see FIG. 2) extending along the length of the respective arrays above the voltaic cells 22 to receive any byproduct gasses issuing from vent holes 32. A tunnel 50 extends between raised portions 12c, 12d and connects the first and second manifolds 38a, 38b. Seals or gaskets 42 may be provided at appropriate locations between cover 12, support rails 24a, 24b and end plates 25 as necessary to substantially seal the interior of battery pack from its environment.

A bridge bar 36 connects terminal 28 of the end-most cell in array 20a with terminal 30 of the adjacent cell in array 20b. Bridge bar 36 comprises a conductive bar 44 (preferably made from copper, aluminum, or other material having good electrical conductivity) and a sealing portion 46 covering the central portion of the conductive bar. Sealing portion 46 may completely surround the center section of conductive bar 44, as shown, or it may be disposed only at locations where sealing contact is required. Bridge bar 36 may be secured to terminals 28, 30 by clips or nuts (not shown) which fit over the top of the terminals. When in the bridging position, sealing portion 46 covers any gap that may exist between inner support rails 24a and may have a rib 46a projecting downwardly into the gap as shown in FIG. 4.

Sealing portion 46 is preferably made of a resilient material that will achieve an effective gas seal when compressed, such as a polymer or synthetic rubber. Sealing portion 46 may be efficiently formed around the conductive bar 44 by an overmolding process.

Tunnel 50 is located on cover 12 so as to be positioned over bridge bar 36 to provide clearance for the bar, and also provides a passage through which any gases collecting in first manifold portion 38a may flow into the second manifold portion 38b. Tunnel 50 may be formed as a part of (integrally with) cover 12, as a single sheet metal stamping or molded plastic part, for example. Alternatively, tunnel 50 may be fabricated as a separate piece and assembled to cover 12 by welding, adhesive, or a joining technique appropriate for the materials used.

Figure 4:
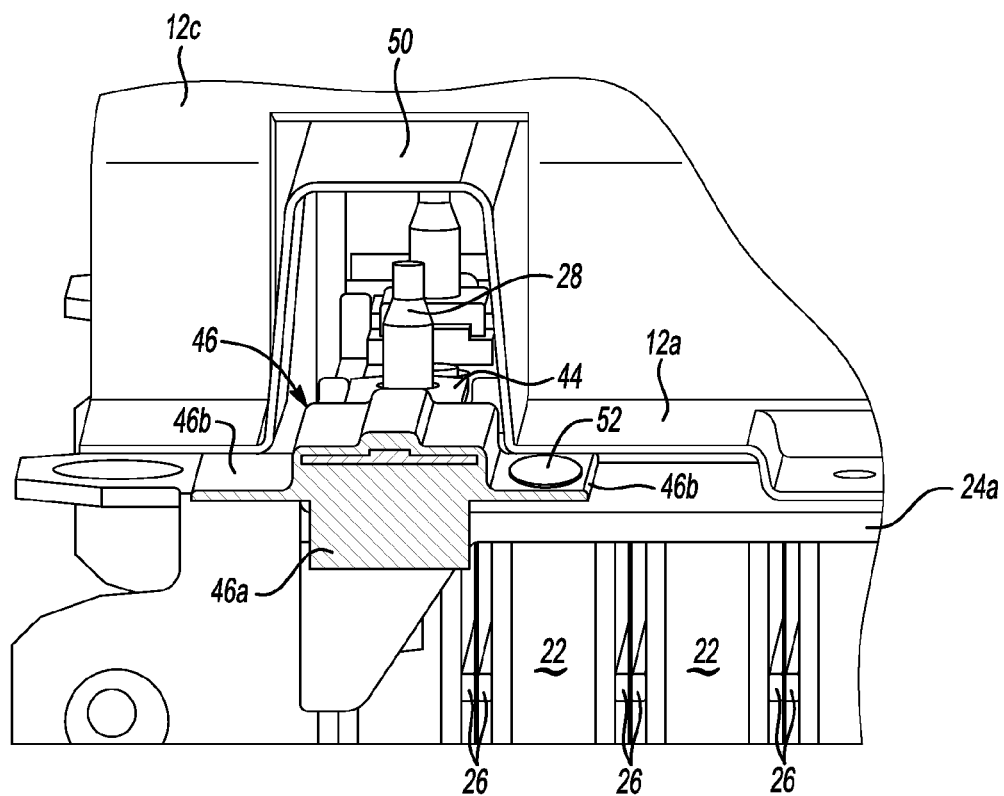
FIG. 4 is another cross-sectional view of the bridging bar installation of FIGS. 2 and 3.

As best seen in FIG. 4, bridge bar sealing portion 46 has flanges 46b extending outward from conductive bar 44. Flanges 46b span a width greater than the width of tunnel 50 so that the sealing portion effectively seals off the tunnel from the cooling gas chamber below. Extra seals may be provided, if necessary, in the vicinity of sealing portion 46, for example, a bead seal 52 disposed above flange 46b as shown in FIG. 4.

A vent outlet tube 54 communicates with vent manifold 38b so that any byproduct gases generated by the cells of either array 20a, 20b can escape and prevent an undesirable pressure increase inside battery pack. The gases are preferably vented outside of the vehicle via outlet tube 54.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A battery pack comprising:
a first and a second array of cells disposed alongside one another, the cells having vent holes oriented toward a surface common to the two arrays;
a housing substantially enclosing the two arrays and defining:
a cooling chamber below the surface and surrounding heat transfer surfaces of the cells;
a first manifold above the surface and sealed from the cooling chamber and collecting gasses generated by the first array;
a second manifold above the surface and sealed from the cooling chamber and substantially sealed from the first manifold and collecting gasses generated by the second array;
a tunnel connecting the first and the second manifolds to allow passage of the collected gasses from the first manifold into the second manifold; and
a discharge opening in the second manifold allowing the collected gasses to escape from the housing; and
a bridge bar connecting a terminal of the first array with a terminal of the second array, at least a portion of the bridge bar disposed in the tunnel.

2. The battery pack of claim 1 further comprising a seal collocated with the bridge bar to provide a gas-tight seal between the tunnel and the cooling chamber.

3. The battery pack of claim 2 wherein the seal surrounds at least a central portion of the bridge bar.

4. The battery pack of claim 2 wherein the seal comprises a rib adapted to project into a gap between the first and second arrays.

5. The battery pack of claim 1 wherein the housing is formed of a single piece of material shaped to define the first and second manifolds and the tunnel.

6. The battery pack of claim 5 wherein the housing is a stamped sheet metal component.

* * * * *